(12) United States Patent
Toohey et al.

(10) Patent No.: US 8,109,524 B1
(45) Date of Patent: Feb. 7, 2012

(54) SHOPPING CART HANDLE COVER

(76) Inventors: Richard Toohey, Palm Beach, FL (US); Randy Rosenberg, Boca Raton, FL (US)

( * ) Notice: Subject to any disclaimer, the term of this patent is extended or adjusted under 35 U.S.C. 154(b) by 0 days.

(21) Appl. No.: 12/985,897

(22) Filed: Jan. 6, 2011

Related U.S. Application Data

(60) Provisional application No. 61/355,422, filed on Jun. 16, 2010.

(51) Int. Cl.
*B62D 39/00* (2006.01)
(52) U.S. Cl. ............... 280/33.992; 297/256.17
(58) Field of Classification Search .............. 280/33.992
See application file for complete search history.

(56) References Cited

U.S. PATENT DOCUMENTS 6,817,066 B1 * 11/2004 Williams et al. ................ 16/435

* cited by examiner

*Primary Examiner* — J. Allen Shriver, II
*Assistant Examiner* — Erez Gurari
(74) *Attorney, Agent, or Firm* — Gold & Rizvi, P.A.; H. John Rizvi; Glenn E. Gold

(57) ABSTRACT

A shopping cart handle cover includes a generally elongated, flexible cover base panel; a generally elongated, flexible cover top panel carried by the cover base panel; and a cover interior defined by and between the cover base panel and the cover top panel. The shopping cart handle cover is designed to slide over a shopping cart handle. The handle cover can be fabricated of a material having elastic properties, allowing the user to stretch the handle cover over the cart handle. The handle cover becomes taut over the cart handle when in a relaxed state. At least one panel handle flap can be provided through the top and base panels. The flap wraps around the cart handle providing protection to the user from bacteria, other microorganisms, and other contaminants. A plurality of handle covers may be provided by joining adjacent covers, providing a perforation therebetween, and rolling the covers onto a core for dispensing.

16 Claims, 8 Drawing Sheets

US 8,109,524 B1

SHOPPING CART HANDLE COVER

CROSS-REFERENCE TO RELATED APPLICATIONS

This Non-Provisional Utility application claims the benefit of U.S. Provisional Patent Application Ser. No, 61/355,422, filed on Jan. 7, 2010, which is incorporated herein in its entirety.

FIELD OF THE INVENTION

The present disclosure generally relates to protective covers for shopping carts and the like. More particularly, the disclosure relates to a shopping cart handle cover that can be placed over a handle on a shopping cart to prevent contamination of a user's hands as the user grips the shopping cart handle through the cover.

BACKGROUND OF THE INVENTION

Shopping carts are commonly used in retail establishments to transport groceries and other items from shelves or other storage or display facilities to a checkout counter and from the establishment to a transporting vehicle. A typical conventional shopping cart includes a wheeled frame on which is provided a typically metal basket. A handle extends from one end of the basket to enable a user to push the shopping cart throughout the establishment. An infant seat may be recessed in the basket adjacent to the handle to support a toddler or small child during shopping.

During shopping, groceries or other items such as hardware are placed in the basket. A user typically grips the handle on the basket with his or her bare hands as the user pushes the cart. Studies have shown that shopping carts, including the shopping cart handle, harbor more bacteria than public toilets due to the presence of bodily fluids and poultry and meat drippings. Germs from users who are or have been sick and have used the cart may also contaminate the handle.

One of the solutions that have been used to remove potential contaminants from shopping carts includes periodical hosing of the shopping carts with pressurized water. However, pressurized water fails to adequately remove the contaminants from the carts. Another solution includes periodically wiping the handle of the shopping cart with a rag or disposable wipe. This method, however, is seldom used and when it is used it tends to merely push the bacteria along the handle and activate the growth of new bacteria, rather than remove the bacteria from the handle.

Therefore, a shopping cart handle cover which can be placed over a handle on a shopping cart to prevent contamination of a user's hands as the user grips the shopping cart handle through the cover is needed.

SUMMARY OF THE INVENTION

The disclosure is generally directed to a shopping cart handle cover which can be placed over a handle on a shopping cart to prevent contamination of a user's hands as the user grips the shopping cart handle through the cover. The shopping cart handle cover may include:

a generally elongated, flexible cover base panel fabricated of a cover material and defined by an elongated opening edge, an elongated rear edge, a first transverse edge, and a second transverse edge;

a generally elongated, flexible cover top panel fabricated of a cover material and defined by an elongated opening edge, an elongated rear edge, a first transverse edge, and a second transverse edge;

wherein said cover top panel and said cover base panel are joined by a first panel seam provided between each of said first transverse edges and a second panel seam provided between said second transverse edges;

a cover interior defined by and between said cover base panel and said cover top panel, and between said first joined transverse edges and said second joined transverse edges, wherein an interior span between said first panel seam and said second panel seam is approximately a width of a shopping cart handle, and an opening provided between said base panel elongated opening edge and said top panel elongated opening edge.

In another aspect, a panel connecting portion may connect the cover top panel and the cover base panel, In still another aspect, at least one panel seam may attach the cover top panel to the cover base panel.

In yet another aspect, each panel seam may include sewing.

In still another aspect, each panel seam may include ultrasonic welding.

In another aspect, each panel seam may include an adhesive.

In a still further aspect, truncated front edges may be provided in each of cover base panel and the cover top panel.

In another aspect, advertising indicia may be provided on at least one of the cover base panel and the cover top panel.

In another aspect, at least one coupon may be attached to the cover top panel and/or the cover base panel.

Regarding another aspect, the coupon may be attached to the cover top panel, the cover base panel, and would be located along a lateral edge and/or along a longitudinal edge.

In yet another aspect, the at least one coupon may be removably attached to the cover by a perforation.

In still another aspect, each coupon may include a human readable image and a machine readable component.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF HE DRAWINGS

Various illustrative embodiments of the disclosure will hereinafter be described in conjunction with the appended drawings provided to illustrate and not to limit the invention in which.

Figure 1:
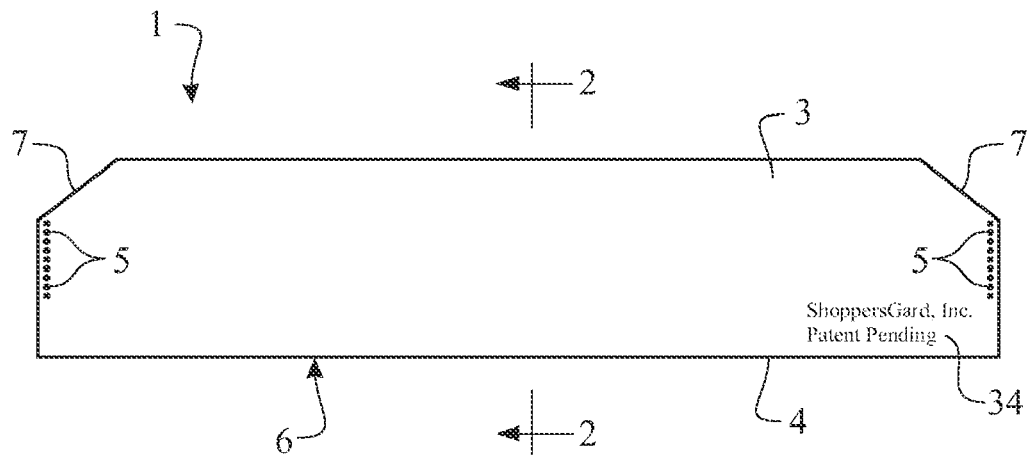
FIG. 1 is a top view of an exemplary embodiment of the shopping cart handle cover.

Repeat use of reference characters in the present specification and drawings is intended to represent the same or analogous features or elements of the invention.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 2:
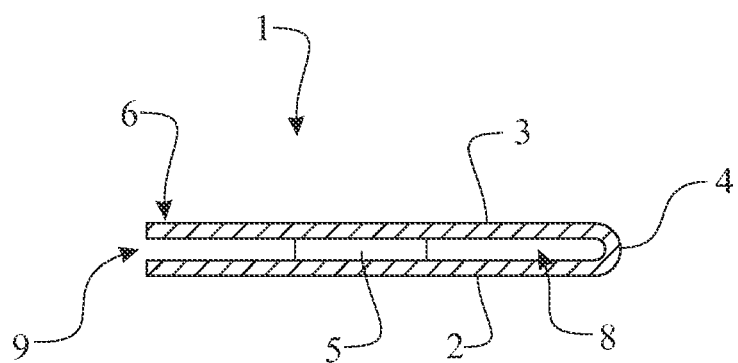
FIG. 2 is a cross-sectional view, taken along section lines 2-2 in FIG. 1.
Figure 3:
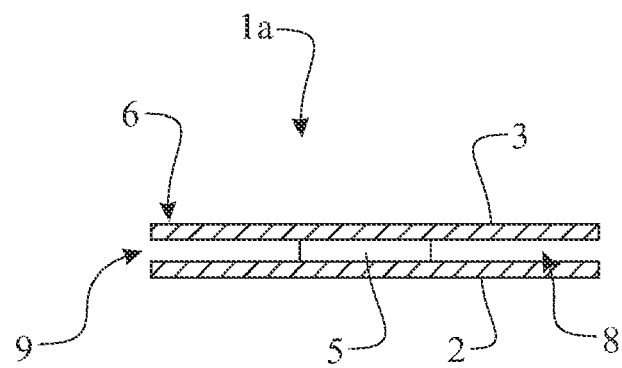
FIG. 3 is a cross-sectional view of an alternative exemplary embodiment of the shopping cart handle cover.

An exemplary embodiment of a shopping cart handle cover 1 is detailed in the illustrations of FIGS. 1 and 2. The shopping can handle cover 1 may include a generally elongated cover body 6 having a generally elongated, rectangular cover base panel 2 (FIG. 2) and a generally elongated, rectangular cover top panel 3 which may be generally parallel to the cover base panel 2. As illustrated in FIG. 1, in some embodiments the cover base panel 3 (as illustrated) and the cover base panel 2 may have truncated front edges 7. The shopping cart handle cover 1 can be fabricated in several form factors, including by folding the cover top panel 3 over the cover base panel 2 at a panel connecting portion 4 as illustrated in FIG. 2. Alternatively, a shopping cart handle cover 1a can be fabricated by attaching separate elements of the cover top panel 3 to the cover base panel 2 together along each lateral edge as illustrated in FIG. 3, leaving either one or both longitudinal edges separate. At least one panel seam 5 may attach the cover top panel 3 to the cover base panel 2 of the cover body 6. A pair of panel seams 5 may attach the cover top panel 3 to the cover base panel 2 as introduced in FIG. 1. The panel seams 5 are preferably oriented and located adjacent to the respective ends of the cover body 6. Each panel seam 5 may be implemented using any suitable attachment mechanism known by those skilled in the art. These may include, for example and without limitation, sewing; ultrasonic welding; heat staking; and/or adhesives, for example and without limitation. A cover interior 8 may be defined by and between the cover base panel 2 and the cover top panel 3 as illustrated in FIGS. 2 and 3. The cover body 6 includes a cover opening 9, which communicates with the cover interior 8 for purposes that will be hereinafter described.

The cover base panel 2 and the cover top panel 3 of the cover body 6 may be any type of flexible sheet material including paper, plastic, and the like. Suitable materials for the cover base panel 2 and the cover top panel 3 include various woven and non-woven natural and/or man-made fabrics. In some embodiments in which the shopping cart handle cover 1 is a one-time-use disposable product, the material of construction may include recyclable materials including but not limited to nonwoven polypropylene fabrics. The material of construction for the cover base panel 2 and the cover top panel 3 may be any of various colors and/or prints. In some embodiments, adhesive (not illustrated) may be applied to the entire area or a selected region or regions on one or both of the cover base panel 2 and the cover top panel 3. The material may include an elastic or pliant property, allowing the material to stretch.

Figure 4:
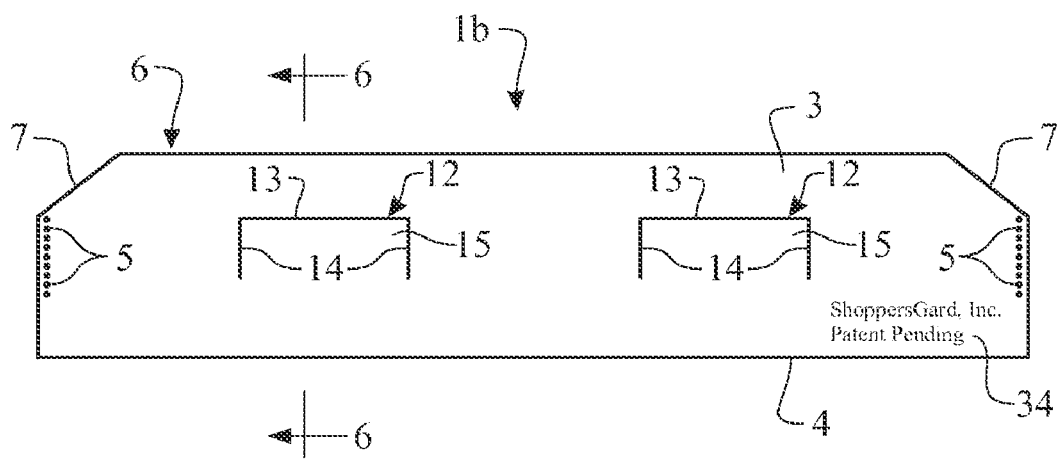
FIG. 4 is a top view of an alternative exemplary embodiment of the shopping cart handle cover.

In some embodiments, various advertising indicia 34 may be provided on the cover top panel 3 and/or elsewhere on the cover body 6 as illustrated in FIGS. 1 and 4. The advertising indicia 34 may include any design, company logo, trademark, message, product information, and/or other printing, which may be accomplished using techniques known in the woven and nonwoven fabric industry. Suitable techniques for printing the advertising indicia 34 on the cover body 6 may include screen printing (rotary and plate), transfer printing, flexographic printing and rotary gravure printing, and the like. The printing inks that are used in these processes may be standard inks known by those skilled in the art. In some embodiments, coatings (not illustrated) may be applied to the entire cover base panel 2 and/or the cover top panel 3 or to selected areas of either or both to enhance the printing quality of the advertising indicia 34.

Referring next to FIGS. 4-8 of the drawings, an alternative illustrative embodiment of the shopping cart handle cover is generally indicated by reference numeral 1b. The shopping cart handle cover 1b may have a design that is similar to that of the shopping cart handle cover 1, 1a of FIGS. 1-3. As illustrated in FIG. 4, at least one top panel handle perforation 12 may be provided in the cover top panel 3 of the shopping cart handle cover 1b. In some embodiments, a pair of spaced-apart top panel handle perforations 12 may be provided in the cover top panel 3, as illustrated. Each top panel handle perforation 12 may include a longitudinal perforation portion 13 which is generally parallel to the longitudinal axis of the cover body 6 and a pair of spaced-apart, parallel transverse perforation portions 14 which extend from the respective ends of the longitudinal perforation portion 13. Each of the transverse perforation portions 14 may be generally perpendicular with respect to the longitudinal perforation portion 13 of each top panel handle perforation 12. A flexible cover panel handle flap 15 may be defined by and between the longitudinal perforation portion 13 and the transverse perforation portions 14 of each top panel handle perforation 12. A pair of spatially arranged top panel handle perforations 12 may be positioned to accommodate both hands of a user. Alternatively, it is understood that a single top panel handle perforation 12 may be sized to accommodate both hands of the user.

Figure 5:
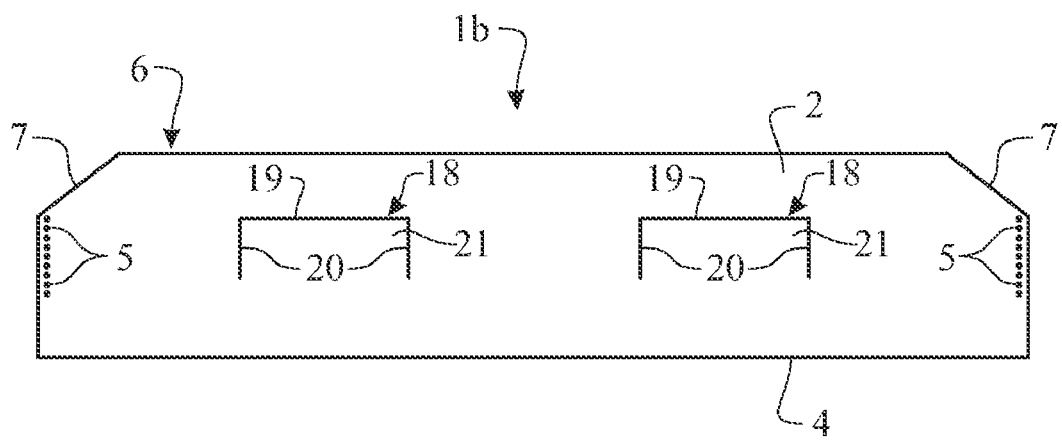
FIG. 5 is a bottom view of the shopping cart handle cover illustrated in FIG. 4.
Figure 6:
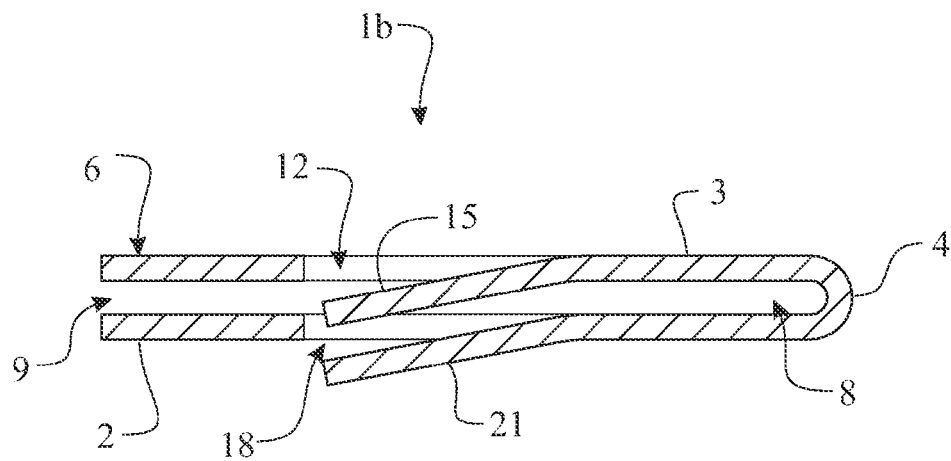
FIG. 6 is a cross-sectional view, taken along section lines 6-6 in FIG. 4.

At least one base panel handle perforation 18 may be provided in the cover base panel 2 of the shopping cart handle cover 1b as illustrated in FIG. 5. In some embodiments, a pair of spaced-apart base panel handle perforations 18 may be provided in the cover base panel 2, as illustrated. Each base panel handle perforation 18 may include a longitudinal perforation portion 19 which is generally parallel to the longitudinal axis of the cover body 6 and a pair of spaced-apart, parallel transverse perforation portions 20 which extend from the respective ends of the longitudinal perforation portion 19. Each of the transverse perforation portions 20 may be generally perpendicular with respect to the longitudinal perforation portion 19 of each base panel handle perforation 18. A flexible base panel handle flap 21 may be defined by and between the longitudinal perforation portion 19 and the transverse perforation portions 20 of each base panel handle perforation 18. As illustrated in FIG. 6, the top panel handle perforation or perforations 12 in the cover top panel 3 may be disposed in generally aligned or registering relationship with respect to the respective base panel handle perforation or perforations 18 in the cover base panel 2 of the cover body 6.

Figure 7:
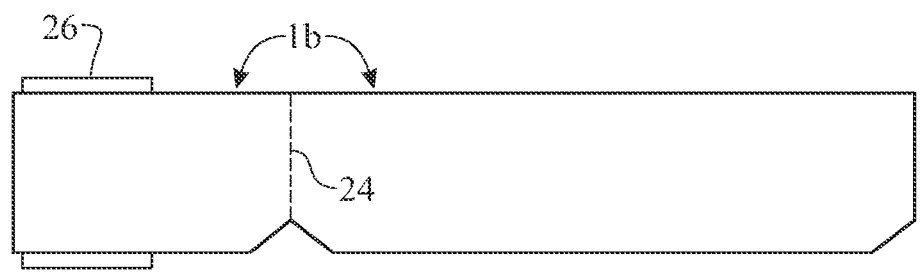
FIG. 7 is a top view of a dispensing roll with multiple perforated and attached shopping cart handle covers wound on the dispensing roll including one shopping cart handle cover unwound from the dispensing roll.
Figure 8:
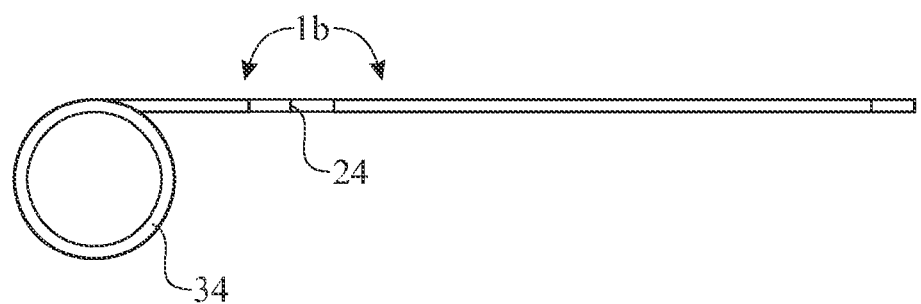
FIG. 8 is a side view of the dispensing roll and partially-unwound shopping cart handle covers illustrated in FIG. 7.

In an exemplary distribution means, multiple shopping cart handle covers 1b may be wound on a dispensing roll 26 as illustrated in FIGS. 7 and 8. This configuration is offered to facilitate selective dispensing of shopping cart handle covers 1b from the dispensing roll 26 in a supermarket, department store, electronics store, pet store, clothing store, or other retail establishment in which the shopping cart handle covers 1, 1a, 1b are likely to be used. Adjacent shopping cart handle covers 1b wound on the dispensing roll 26 may be attached in end-to-end relationship to each other along a perforated attachment line 24. Accordingly, the shopping cart handle covers 1b may be selectively and individually or successively detached from the rolled shopping cart handle covers 1b which are wound on the dispensing roll 26 by tearing each shopping cart handle cover 1b from the adjacent shopping cart handle cover 1b along the perforated attachment line 24. In a like manner, multiple shopping cart handle covers 1 (FIGS. 1 and 2) and multiple shopping cart handle covers 1a (FIG. 3) may be attached to each other along perforated attachment lines 24 (FIG. 7) and wound on a dispensing roll 26 in the respective applications.

Figure 9:
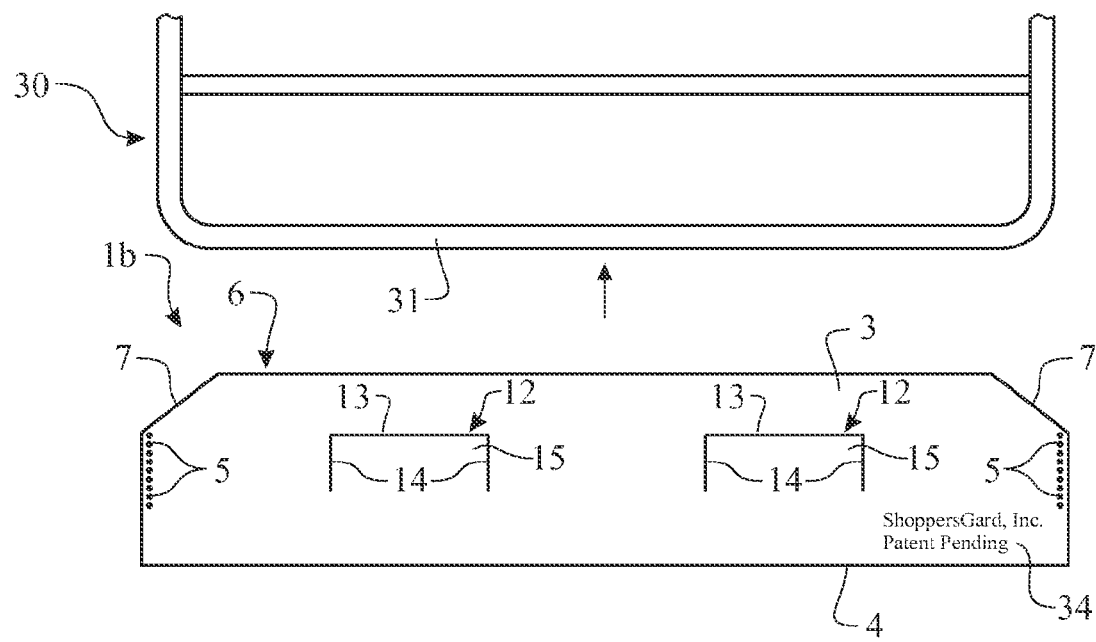
FIG. 9 is a top view of the exemplary embodiment of the shopping cart handle cover, more particularly illustrating placement of the shopping cart handle cover on a handle of a shopping cart (in section)
Figure 10:
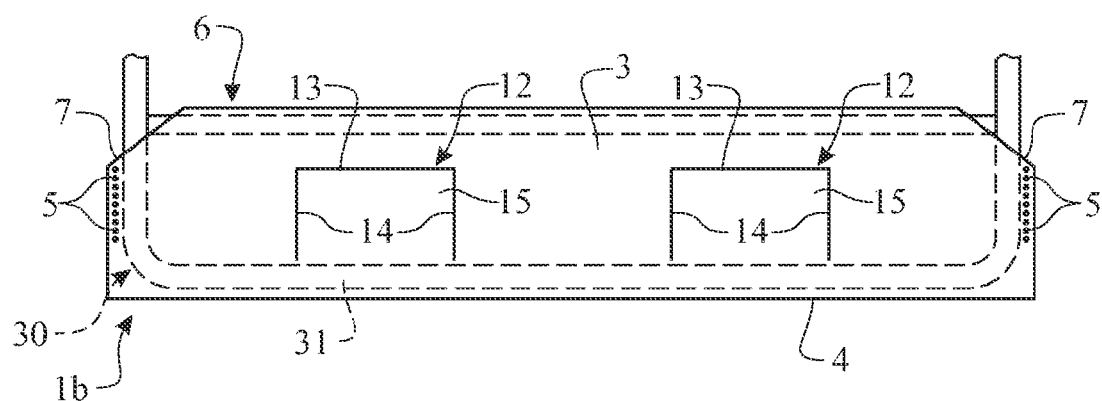
FIG. 10 is a top view of the exemplary embodiment of the shopping cart handle cover in a functional handle-covering position on the shopping cart handle.
Figure 11:
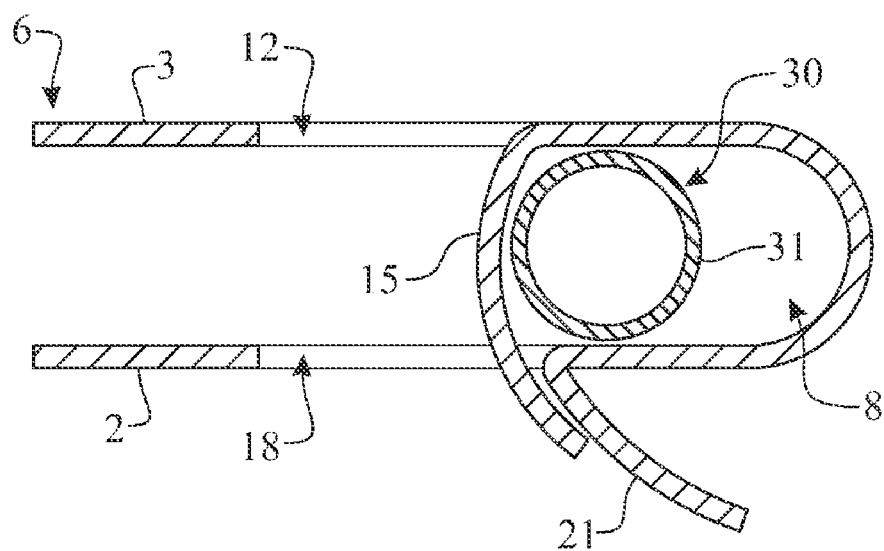
FIG. 11 is a sectional view of the shopping cart handle cover placed on the shopping cart handle, with a pair of handle flaps extending through respective flap perforations in the shopping cart handle cover.

In an exemplary application, the shopping cart handle cover 1b is placed over a shopping cart handle 31 on a shopping cart 30 in a supermarket, hardware store or other retail establishment to protect the hands (not illustrated) of a user from being contaminated by bacteria, viruses, and other contaminants that may be resident upon the shopping cart handle 31 as illustrated in FIGS. 9-13. Accordingly, as illustrated in FIG. 9, the shopping cart handle cover 1b is initially oriented such that the truncated front edges 7 of the cover body 6 face the shopping cart handle 31. The shopping cart handle cover 1b is moved forwardly toward the stationary shopping cart handle 31 (or alternatively, the shopping cart handle 31 may be moved rearwardly toward the stationary shopping cart handle 1b) such that the cover opening 9 (FIG. 6) of the cover body 6 receives the shopping cart handle 31. Forward movement of the shopping cart handle cover 1b is continued until the stationary shopping cart handle 31 moves beyond the top panel handle perforations 12 and the base panel handle perforations 18 into the cover interior 8 of the cover body 6, as illustrated in FIGS. 10 and 11. A user (not illustrated) then extends his or her fingers through the top panel handle perforations 12 in the cover top panel 3 and the base panel handle perforations 18 in the cover base panel 2 such that the cover panel handle flaps 15 and the base panel handle flaps 21 are disposed between the user's fingers and the shopping cart handle 31. The user maintains his or her grasp on the shopping cart handle cover 1b as he or she pushes the shopping cart 30 around the retail establishment. Accordingly, the cover panel handle flaps 15 and the base panel handle flaps 21 prevent bacteria, other microorganisms, and other contaminants on the shopping cart handle 31 from contacting and contaminating the hands of the user. It will be appreciated by those skilled in the art that the top panel handle perforations 12 and the base panel handle perforations 18 in the cover top panel 3 and the cover base panel 2, respectively, facilitate a secure grip on the shopping cart handle 31 while preventing contamination of the user's hands by bacteria other microorganisms, and other contaminants on the shopping cart handle 31. After use is completed, the shopping cart handle cover 1b may be removed from the shopping cart handle 31 and discarded.

Figure 12:
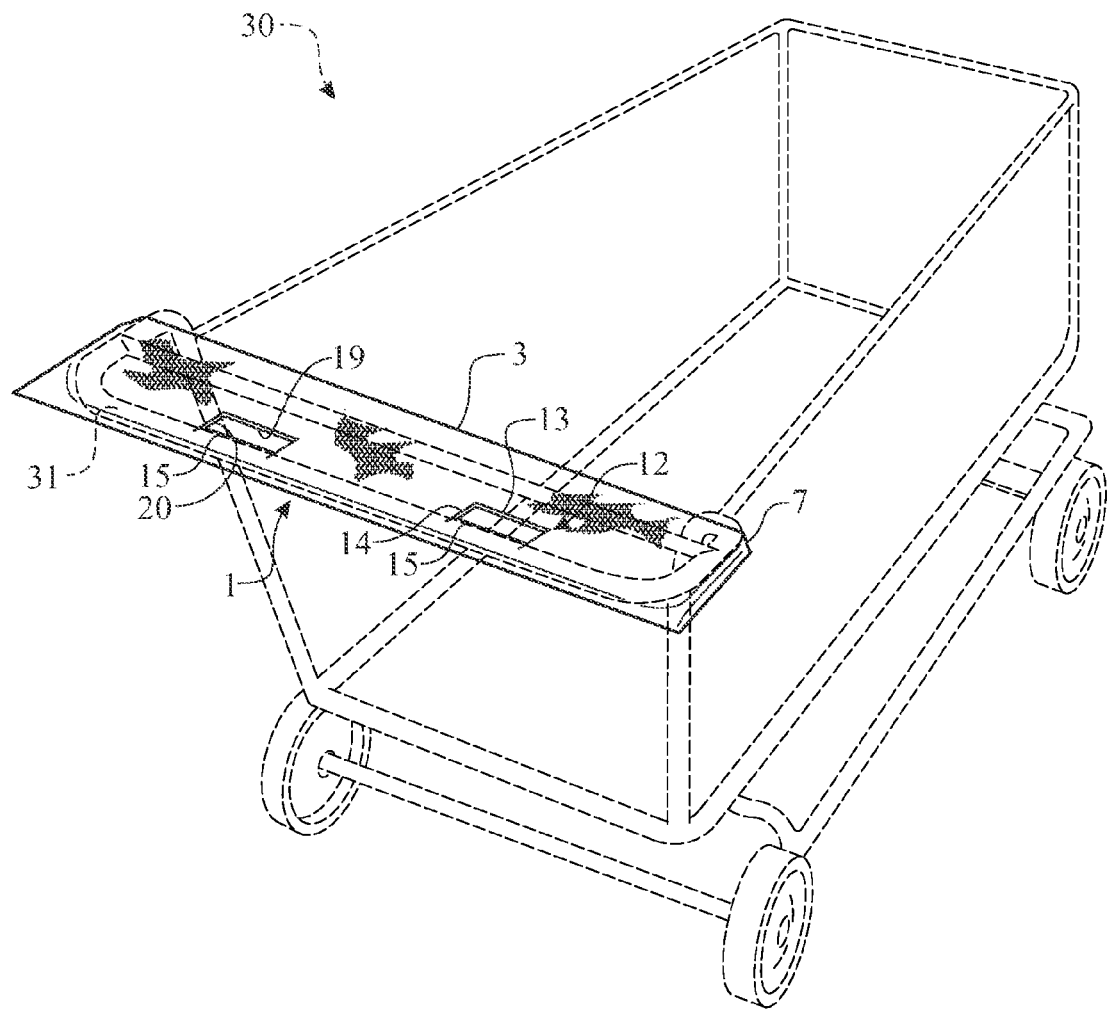
FIG. 12 is an isometric view of the shopping cart handle cover placed on the shopping cart handle prepared for use.
Figure 13:
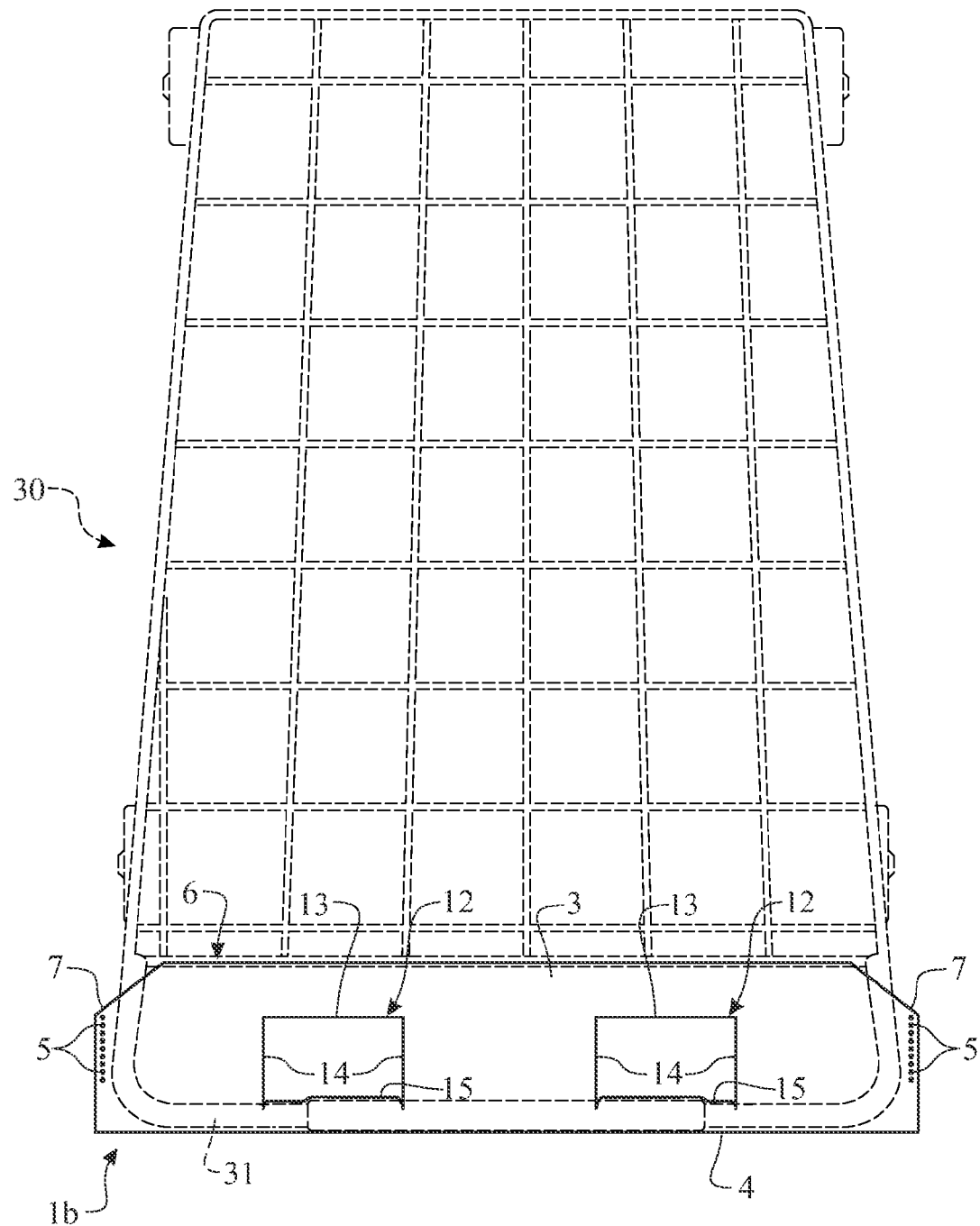
FIG. 13 is a top view of the shopping cart handle cover placed on the shopping cart handle prepared for use.

The shopping cart handle covers 1, 1a, 1b may be fabricated of a material having an elastic or pliant property. Alternatively, the material can be oriented on a bias (diagonal to the weave) to achieve an elastic-like property. The shopping cart handle cover 1, 1a, 1b may be fabricated having a span along the longitudinal length of the opening 9 that provides a taut fit over the shopping cart handle 31 as illustrated in FIGS. 10, 12 and 13. The user would position one edge over a respective handle portion and stretch the shopping cart handle cover 1, 1a, 1b to position the opposite edge over the respective opposite handle portion. Once the shopping cart handle cover 1, 1a, 1b is in position on the shopping cart handle 31, the shopping cart handle cover 1, 1a, 1b relaxes, tightening over the shopping cart handle 31.

Application of the shopping cart handle cover 1 (FIGS. 1 and 2) and the shopping cart handle cover 1a (FIG. 3) may be as was heretofore described with respect to the shopping cart handle cover 1b in FIGS. 9-13. In application of the shopping cart handle cover 1 and the shopping cart handle cover 1a, the user grips the cover top panel 3 and the cover base panel 2 against the shopping cart handle 31. Accordingly, the cover top panel 3 and the cover base panel 2 prevent bacteria and other microorganisms from contaminating the hands of the user. After use, the shopping cart handle cover 1 or the shopping cart handle cover 1a may be removed from the shopping cart handle 31 of the shopping cart 30 and discarded.

As the user pushes the shopping cart 31, the advertising indicia 31 (FIG. 1) on the cover body 6 may remain visible to the user. In some applications, the advertising indicia 34 may be coupled with internet-based promotions and transactions. In some applications, the advertising indicia may include advertising information for a retail establishment in which the shopping handle cart cover 1b is used or for products, which are sold in the retail establishment. In some applications, the advertising indicia 34 may be based on a cooperative marketing strategy by which various products, promotions, discounts and other messages may be printed on or attached to the shopping handle cart cover. Bar codes, radio frequency identification (RFID) tags and other methods may be used to provide direct consumer discounts (coupons) and to gather data regarding consumer buying patterns as well as to link the advertisement, promotion or other message to a particular consumer through preferred customer information systems in place at the retail establishment. Furthermore, an internet-based strategy may directly link the consumer to the retailer, individual products, product categories, brands or advertisers. Consumer data that is gathered through the use of the seat liner product may also be used to link directly with internet-based advertising and other media.

The shopping handle cart covers of the present disclosure may be presented to consumers at a retail location at or near a shopping cart pickup area. For example and without limitation, in some applications, the shopping cart handle covers may be dispensed from a dispensing roll 26 (FIGS. 7 and 8) which may be rotatably assembled inside a suitable wall-mounted housing or bracket (not illustrated) in a convenient location inside a retail establishment or the like, in other applications, the shopping cart handle covers may be packaged in any suitable container, which facilitates easy and user-friendly dispensing of the shopping cart handle covers.

A goal of the shopping cart handle covers 1, 1a, 1b is to prevent the spread of disease. In order to be effective, the merchants need to offer the shopping cart handle covers 1, 1a, 1b, then there needs to be an incentive for the consumer to use the shopping cart handle covers 1, 1a, 1b. Therefore, it is desirable to include features that can entice a customer to use the shopping handle cart covers 1, 1a, 1b. Additionally, it is desirable to include a feature that can aid in offsetting the cost of goods for the merchant. It is further enticing where the shopping cart handle covers 1, 1a, 1b can create an income stream.

Figure 14:
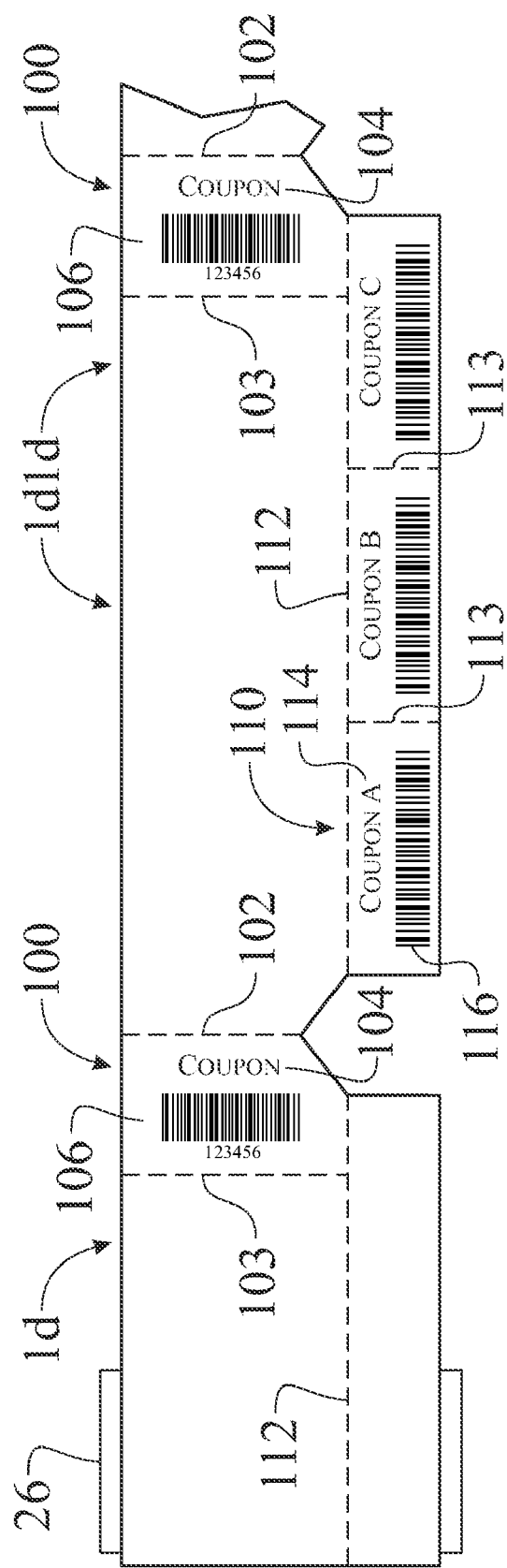
FIG. 14 is a top view of another exemplary shopping cart handle cover introducing optional coupons.

One means to accomplish both objectives would be to include at least one coupon 100, 110 as illustrated in FIG. 14. The cover may include one or more edge coupons 100 and/or one or more opening coupons 110. The coupons 100, 110 include human readable coupon information 104, 114 and preferably machine readable information 106, 116. The human readable coupon information 104, 114 can include manufacturer information, product information, savings information, expiration information, rebate information, and the like. The machine readable information 106, 116 can be provided in the form of a common Barcode, a Radio Frequency Identification (RFID), a Matrix Barcode, an Aztec Code, an EZCode, MaxiCode, a ShotCode, and the like. The coupons 100, 110 can be fixed to the cover Id or detachable, such as using at least one perforation 102, 112, 113.

An edge coupon 100 may be located in communication with a transverse edge of the cover 1d. The edge coupon 100 would be positioned between two adjacent covers 1d, including an optional perforation 103 allowing for detachment from the cover 1d. Alternatively, the coupon can be integrated (or printed upon) a section of the cover Id proximate the transverse edge. It is understood that the layout may include a single edge coupon 100 (as illustrated) or a pair of edge coupons 100.

One or more opening coupons 110 may be located in communication with a longitudinal edge of the cover 1d. The opening coupons 110 would be positioned extending outward from the longitudinal edge of the cover 1d. It is understood that the layout may include a single opening coupon 110 or a series of opening coupons 110. The series of opening coupons 110 would include a perforation 113 between each pair of adjacent coupons 110. The consumer can separate the coupons 100, 110 from the body of the cover 1d and transfer the coupons to the check out person. Alternately, the coupons may remain intact where the check out person would scan the machine readable interface 106, 116, while the cover 1d remains positioned on the cart handle 31.

The coupons 100, 110 would entice the customer to obtain one of the covers 1d from the dispenser. Once the customer obtains the cover id, it is highly likely that they will use it. An advertiser would pay to include the coupons 100, 110 on the covers 1d. The advertising fees may be greater than the cost of the covers 1d, therefore, providing a profit to the merchant.

An anti-bacterial composition may be applied to the inner surfaces of the shopping cart handle cover 1, 1a, 1b to provide additional protection to the user.

It is recognized that the shopping cart handle cover 1, 1a, 1b is provided to protect the user from bacteria, other microorganisms, and other contaminants. Therefore, it is desirous to manufacture and package the shopping cart handle cover 1, 1a, 1b in sterile conditions and packaged accordingly.

It will be appreciated by those skilled in the art that the construction of the shopping cart handle covers according to the present disclosure render the shopping cart handle covers amenable to low-cost manufacturing. Accordingly, the design of the shopping cart handle covers allows for a cost-effective, fully automated, roll-to-roll manufacturing process known by those skilled in the art.

While illustrative embodiments of the disclosure have been described above, it will be recognized and understood that various modifications can be made and the appended claims are intended to cover all such modifications which may fall within the spirit and scope of the disclosure.

What is claimed is:

1. A method of covering a shopping cart handle, the method comprising steps of:
   obtaining a shopping cart handle cover, said cover comprising:
   a generally elongated, flexible cover base panel fabricated of a cover material and defined by an elongated opening edge, an elongated rear edge, a first transverse edge, and a second transverse edge,
   a generally elongated, flexible cover top panel fabricated of a cover material and defined by an elongated opening edge, an elongated rear edge, a first transverse edge, and a second transverse edge,
   wherein said cover top panel and said cover base panel are joined by a first panel seam provided between each of said first transverse edges and a second panel seam provided between said second transverse edges,
   a cover interior defined by and between said cover base panel and said cover top panel, and between said first joined transverse edges and said second joined transverse edges, wherein an interior span between said first panel seam and said second panel seam is approximately a width of a shopping cart handle, and
   an opening provided between said base panel elongated opening edge and said top panel elongated opening edge;
   expanding said opening of said shopping cart handle cover;
   positioning said shopping cart handle cover over a shopping cart handle; and
   sliding said shopping cart handle cover onto said shopping cart handle.

2. A method of covering a shopping cart handle as recited in claim 1, the method further comprising steps of:
   obtaining a shopping cart handle cover having at least one of said cover base panel and said cover top panel being fabricated of a material having elastic properties;
   stretching said shopping cart handle cover over said shopping cart handle; and
   allowing said shopping cart handle cover to contract, tightening said shopping cart handle cover upon said shopping cart handle.

3. A method of covering a shopping cart handle as recited in claim 2, the method further comprising steps of:
   obtaining a shopping cart handle cover further comprising a flexible cover panel handle flap provided in said top panel, said flexible cover top panel handle flap defined by a pair of transverse perforations extending rearward from each end of a longitudinal perforation; and
   folding said flexible cover top panel handle flaps around said shopping cart handle.

4. A method of covering a shopping cart handle as recited in claim 3, the method further comprising steps of:
   obtaining a shopping cart handle cover further comprising a flexible cover panel handle flap provided in said base panel, said flexible cover base panel handle flap defined by a pair of transverse perforations extending rearward from each end of a longitudinal perforation and located in registration with said flexible cover top panel handle flap; and folding said flexible cover base panel handle flap downward to create a hand clearance through said flexible base panel.

5. A method of covering a shopping cart handle as recited in claim 2, the method further comprising steps of:

obtaining a shopping cart handle cover further comprising a pair of spatially arranged flexible cover panel handle flaps provided in said top panel, each flexible cover panel handle flap defined by a pair of transverse perforations extending rearward from each end of a longitudinal perforation forming a flexible cover panel handle flap;

folding said flexible cover panel handle flaps around said shopping cart handle.

6. A method of covering a shopping cart handle as recited in claim 5, the method further comprising steps of:

obtaining a shopping cart handle cover further comprising a pair of spatially arranged flexible cover panel handle flaps provided in said base panel, each flexible cover base panel handle flap defined by a pair of transverse perforations extending rearward from each end of a longitudinal perforation and located in registration with each respective flexible cover top panel handle flap; and folding said flexible cover base panel handle flaps downward to create a hand clearance through said flexible base panel.

7. A method of covering a shopping cart handle as recited in claim 1, the method further comprising steps of:

providing anti-bacterial protection to the user by applying an anti-bacterial composition to an interior surface of said shopping cart handle cover.

8. A method of covering a shopping cart handle as recited in claim 1, the method further comprising steps of:

advertising by incorporating an indicia upon at least one of said cover base panel and said cover top panel.

9. The shopping cart handle cover as recited in claim 1, further comprising at least one coupon, wherein the at least one coupon is at least one of:

a) attached to the cover top panel transverse edge,
b) attached to the cover base panel transverse edge,
c) removably attached to the cover top panel transverse edge,
d) removably attached to the cover base panel transverse edge,
e) attached to the cover top panel elongated opening edge,
f) attached to the cover base panel elongated opening edge,
g) removably attached to the cover top panel elongated opening edge, and
h) removably attached to the cover base panel elongated opening edge.

10. A method of covering a shopping cart handle, the method comprising steps of:

obtaining a plurality of shopping cart handle covers, each cover comprising:

a generally elongated, flexible cover base panel fabricated of a cover material and defined by an elongated opening edge, an elongated rear edge, a first transverse edge, and a second transverse edge, a generally elongated, flexible cover top panel fabricated of a cover material and defined by an elongated opening edge, an elongated rear edge, a first transverse edge, and a second transverse edge, wherein said cover top panel and said cover base panel are joined by a first panel seam provided between each of said first transverse edges and a second panel seam provided between said second transverse edges, a cover interior defined by and between said cover base panel and said cover top panel, and between said first joined transverse edges and said second joined transverse edges, wherein an interior span between said first panel seam and said second panel seam is approximately a width of a shopping cart handle, and an opening provided between said base panel elongated opening edge and said top panel elongated opening edge;

wherein said plurality of shopping cart handle covers are arranged having adjacent shopping cart handle covers wound on the dispensing roll attached in end-to-end relationship to each other along a perforated attachment line;

separating a single shopping cart handle cover from said plurality of shopping cart handle covers;

expanding said opening of said shopping cart handle cover;

positioning said shopping cart handle cover over a shopping cart handle; and sliding said shopping cart handle cover onto said shopping cart handle.

11. A method of covering a shopping cart handle as recited in claim 10, the method further comprising steps of:

obtaining a shopping cart handle cover having at least one of said cover base panel and said cover top panel being fabricated of a material having elastic properties;

stretching said shopping cart handle cover over said shopping cart handle; and allowing said shopping cart handle cover to contract, tightening said shopping cart handle cover upon said shopping cart handle.

12. A method of covering a shopping cart handle as recited in claim 11, the method further comprising steps of:

obtaining a shopping cart handle cover further comprising at least one flexible cover panel handle flap provided in said top panel, said flexible cover top panel handle flap defined by a pair of transverse perforations extending rearward from each end of a longitudinal perforation; and folding said flexible cover top panel handle flaps around said shopping cart handle.

13. A method of covering a shopping cart handle as recited in claim 11, the method further comprising steps of:

obtaining a shopping cart handle cover further comprising at least one flexible cover panel handle flap provided in said base panel, said flexible cover base panel handle flap defined by a pair of transverse perforations extending rearward from each end of a longitudinal perforation and located in registration with said flexible cover top panel handle flap; and folding said flexible cover base panel handle flap downward to create a hand clearance through said flexible base panel.

14. A method of covering a shopping cart handle as recited in claim 10, the method further comprising steps of:

placing said plurality of shopping cart handle covers on a roll for dispensing.

15. A method of covering a shopping cart handle as recited in claim 10, the method further comprising steps of:

providing anti-bacterial protection to the user by applying an anti-bacterial composition to an interior surface of said shopping cart handle cover.

16. The shopping cart handle cover as recited in claim 10, further comprising at least one coupon, wherein the at least one coupon is at least one of:
   a) attached to the cover top panel transverse edge,
   b) attached to the cover base panel transverse edge,
   c) removably attached to the cover top panel transverse edge,
   d) removably attached to the cover base panel transverse edge,
   e) attached to the cover top panel elongated opening edge,
   f) attached to the cover base panel elongated opening edge,
   g) removably attached to the cover top panel elongated opening edge, and
   h) removably attached to the cover base panel elongated opening edge.

* * * * *